United States Patent

Greenwood

[11] Patent Number: 5,308,297
[45] Date of Patent: May 3, 1994

[54] TRANSMISSIONS OF THE TOROIDAL-RACE ROLLING-TRACTION TYPE

[75] Inventor: Christopher J. Greenwood, Preston, England

[73] Assignee: Torotrak (Development) Limited, England

[21] Appl. No.: 859,445

[22] PCT Filed: Nov. 30, 1990

[86] PCT No.: PCT/GB90/01868
§ 371 Date: May 28, 1992
§ 102(e) Date: May 28, 1992

[87] PCT Pub. No.: WO91/08405
PCT Pub. Date: Jun. 13, 1991

[30] Foreign Application Priority Data

Dec. 1, 1989 [GB] United Kingdom ............... 8927161

[51] Int. Cl.$^5$ .............................................. F16H 15/08
[52] U.S. Cl. ............................................ 476/10; 476/42
[58] Field of Search ............................... 476/10, 40, 42

[56] References Cited

U.S. PATENT DOCUMENTS 4,662,248  5/1987  Greenwood ........................ 74/867

FOREIGN PATENT DOCUMENTS 0306272  3/1989  European Pat. Off. .
449674  9/1927  Fed. Rep. of Germany .
62-147159  7/1987  Japan ............................. 476/42
2018894  10/1979  United Kingdom .............. 476/42
2023753  1/1980  United Kingdom .
9002277  3/1990  World Int. Prop. O. ............ 476/42

Primary Examiner—Leslie A. Braun
Assistant Examiner—David W. Laub
Attorney, Agent, or Firm—Davis, Bujold & Streck

[57] ABSTRACT

A variator for a transmission of the toroidal-race rolling-traction type in which a multiplicity of input discs (1-4) and output discs (11-13) are arranged in coaxial sequence, all disc except the first (1) and last (4) in the sequence being formed with races (9, 10) on both of their faces. Drive is transmitted from the output discs to one (35) or several (45-47) output shafts, the output shaft or shafts preferably lying parallel to but displaced from the common axis (8) of the discs. Alternative ways of inter-relating the orientation of the torque-transmitting rollers (20), to produce single or multiple outputs of the transmission, are described. The invention offers the prospect of a variator of higher-than-normal traction-transmitting capacity but using discs of only normal size.

10 Claims, 2 Drawing Sheets

TRANSMISSIONS OF THE TOROIDAL-RACE ROLLING-TRACTION TYPE

BACKGROUND OF THE INVENTION

This invention relates to transmissions of the toroidal-race rolling-traction type, and more particularly to the variator, that is to say the ratio-varying component, of such a transmission.

As is well known to the man in the art, the essential components of such a variator include at least one input disc and one output disc, rotatable about a common axis so that a pair of discs, one of each type, face each other across an axial clearance. A part-toroidal race is formed in each input disc and another in each output disc, the two races of each disc conforming to different parts of the surface of a single, imaginary torus coaxial with the two discs. A set of variably-oriented rollers rolls in contact with both races, and an "end load" is applied axially to discs to urge the discs and rollers into contact and so enable each roller to transmit the appropriate traction from its input disc to its output disc. By changing the orientation of the rollers, so that the radius at which each roller contacts the input disc changes in the opposite sense to the radius at which contact is made with the output disc, the speed ratio transmitted between the input and output discs is varied also.

In a common known type of such a transmission, of which examples are shown in GB-C-2023753 and U.S. Pat. No. 4,662,248, a single and double-faced output disc lies between two input discs, the toroidal races of which face towards each other. One set of rollers transmits traction between the first input disc and one face of the output disc, and a matching set of rollers transmits traction between the second input disc and the other face of the output disc. In both cases, all the traction is transmitted through a single disc—in these examples, the output disc. This is still the case even if, as has been proposed, the design is inverted so that the two connected output discs lie to either side of a single input disc. It should also be noted that in such a transmission the axially-outermost discs will be of the same kind—that is to say both input or both output—and will therefore be without relative rotation. By avoiding the need for rotary thrust bearings, this greatly simplifies the task of applying to those discs the axial "end load" that has already been mentioned.

A problem that has faced the designers of such variators is that the required traction-transmitting capacity of the variator has dictated the size of the single disc just referred to. If a given variator has to be redesigned to increase its capacity, then that redesign must involve providing a disc that is of greater radius or otherwise of greater strength and size.

The present invention arises from appreciating the possibility of making a variator of higher-than-normal traction-transmitting capacity from discs of only normal size, by providing a coaxial sequence of at least two input discs and at least two output discs arranged in a particular way, which includes the characteristic that all the discs except the first and the last in the sequence are formed with part-toroidal races on both of their faces. The invention is thus distinguished from the known type of variator shown by way of example in FIG. 3 of patent specification EP-A-0306272 in which the output discs 26 and 27, like the input discs 21 and 22, are and can only be single-faced. The invention is defined by the claims, the contents of which should be read as included within the specification.

BRIEF DESCRIPTION OF THE DRAWINGS

The invention will now be described by way of example with reference to the accompanying drawings in which:

FIG. 4 is a diagrammatic view in the direction of arrow A in FIG. 1.

DESCRIPTION OF THE PREFERRED EMBODIMENTS

Figure 1:
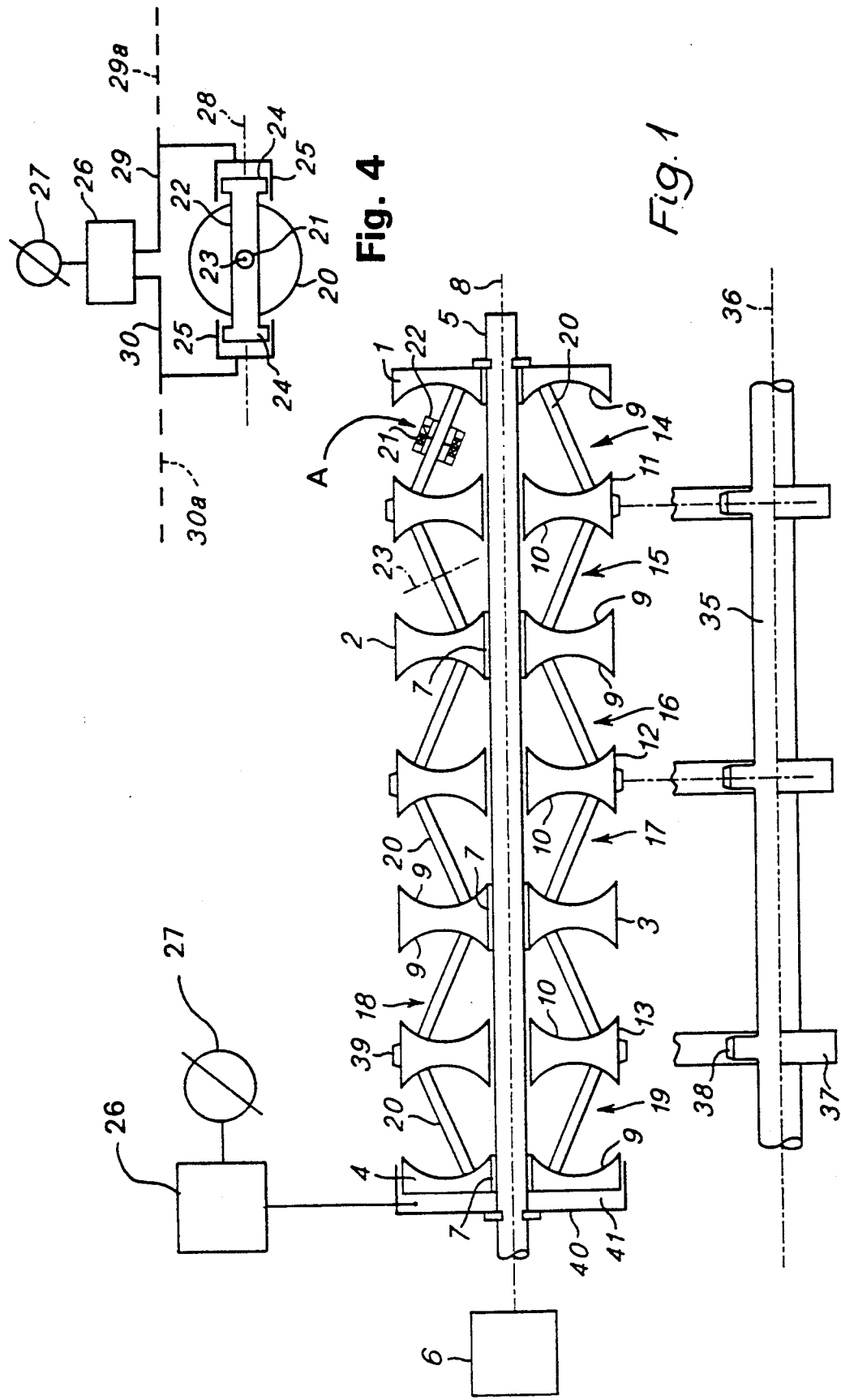
FIG. 1 shows a transmission in outline in axial section, with some parts shown schematically only.

In FIG. 1, four input discs 1-4 are mounted on the variator input shaft 5 which is connected directly or indirectly to a prime mover 6. Disc 1 is fixed to shaft 5, but discs 2-4 are splined to the shaft at 7 so that no relative rotation about the shaft axis 8 can take place, but limited relative axial movement is possible. Discs 1 and 4 are each formed with a single part-toroidal race 9, while discs 2 and 3 have such a race 9 formed on each of their two opposite faces.

Three output discs 11-13, each formed with a complementary toroidal race 10 on each of its two opposite faces, are mounted to rotate on shaft 5 and are all also capable of limited axial movement relative to that shaft. Six sets 14-19 of rollers 20 transmit traction between races 9, 10 of input and output discs 1 and 11, 2 and 11, 2 and 12, 3 and 12, 3 and 13, 4 and 13 respectively. The input discs 1-4 and output discs 11-13 are thus arranged alternately in sequence along shaft 5. In the drawing two of the rollers 20 of each set are depicted, apparently separated from each other by 180° of arc about axis 8; in fact, each set will typically comprise not two rollers but three, separated from each other by 120° of arc. As is shown as an example in FIG. 4, each roller 20 is mounted in a bearing 21 in a carriage 22 to spin about an axis 23, and each end of the carriage is formed as a piston 24 moveable within a cylinder 25. The two cylinders 25 of the carriage are connected, by way of hydraulic lines 29, 30 and of a control valve system indicated generally at 26, to a source 27 of hydraulic fluid under pressure. The pistons and cylinders 24, 25 of any one carriage 22 are so aligned, relative to the discs between which the mounted roller 20 is transmitting traction, that movement of the carriage away from one cylinder and towards the other causes the roller centre to move around the circumference of the centre circle of the torus presented by the input and output disc races. Pistons 24 and with them the carriage 22 are free to rotate about the common axis 28 of cylinders 25. In a manner which is now well known in the art, for example shown in U.S. Pat. No. 4,662,248, the resultant axial force exerted upon carriage 22 by reason of the contacts between roller 20 and the input and output races must be balanced by the resultant axial force exerted upon pistons 24 by the fluid in cylinders 25, if the system is to be in equilibrium. Any change in equilibrium, whether induced by reaction change at the roller-disc interfaces or by commands to valve 26 to change the resultant pressure in the two cylinders 25, results in an axial movement of carriage 22 and with it a rotation about axis 28, so tilting the roller 20 and changing the transmitted ratio, until equilibrium is restored at the new ratio. As shown in the main part of FIG. 1, all the rollers of all the sets 14–19 lie at the same angle relative to axis 8, and so are transmitting the same ratio between their respective input and output discs. This will be achieved by connecting the hydraulic lines 29, 30 to the opposite end cylinders 25 not just of a single roller, but of all the rollers in the system, by means of extensions 29a, 30a as shown in the inset to FIG. 1. However, as will be referred to later, although it is naturally essential that all the rollers within each of the six separate sets 14 to 19 should transmit the same ratio, it is possible to divide the rollers of the six sets into two or more separate groups, all the rollers within each group transmitting a ratio that is unique to that group. To achieve this it would of course be necessary to supply the end cylinders 25 of each group by way of unique hydraulic lines from valve system 26, so as to set up the different net axial forces which the different groups would require.

In FIG. 1 a single output member (or in the case of the FIG. 3 embodiment, input member) the form of an output shaft 35, rotatable about an axis 36, is displaced from but parallel to the input shaft 5, and is driven by chains 37 which engage with chain sprockets 38, formed on shaft 35, and with sprocket teeth 39 formed on the rims of output discs 11–13.

In order for the rollers 20 to transmit traction it is necessary, as has already been noted, that the outermost input discs 1 and 4 should be subjected to an axial "end load". Because all the discs except input disc 1 are capable of axial movement relative to shaft 5, this end load urges all the discs and rollers together axially, and generates the reaction force, at each disc-roller interface, that is necessary for traction transmission. The end load may conveniently be generated, in a manner well known in the art, by fixing a cylindrical casing 40 to shaft 5 so that disc 4 constitutes a piston movable within it. The end load is generated by hydraulic fluid, supplied to the cylinder cavity 41 from source 27 at appropriate pressure by way of the control valve system 26.

One apparent advantage of the invention, as just described, with reference to FIG. 1, is that the total tractive torque supplied to the single output shaft 35 is the sum of the three and substantially equal torques transmitted to it from output discs 11, 12 and 13. Assuming that those discs and the associated chains 37 and sprockets 38 are only normal, small-sized production components, between them they have transmitted a total torque that would have required a component of much larger size had a single output disc been required to transmit the total torque.

Figure 2:
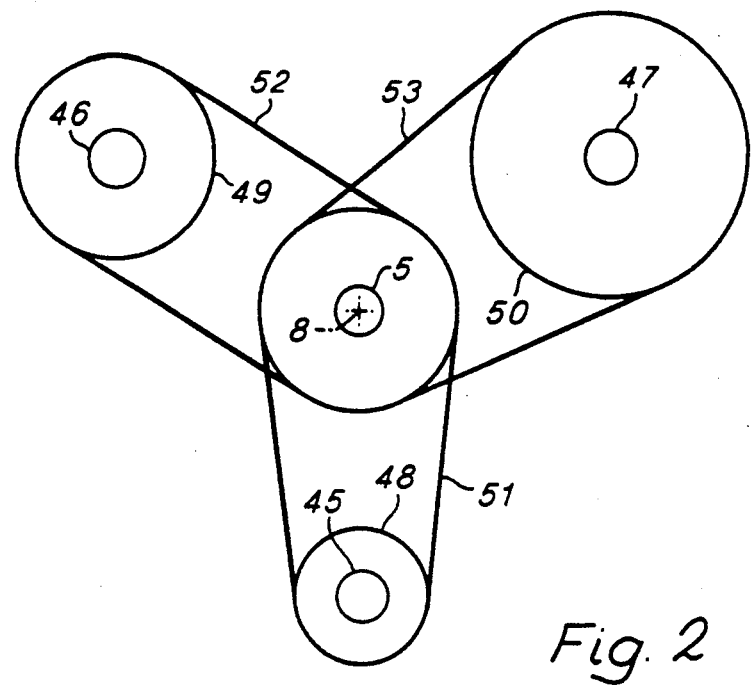
FIG. 2 shows an alternative application in outline, and in end elevation of the transmission of the present invention.
Figure 3:
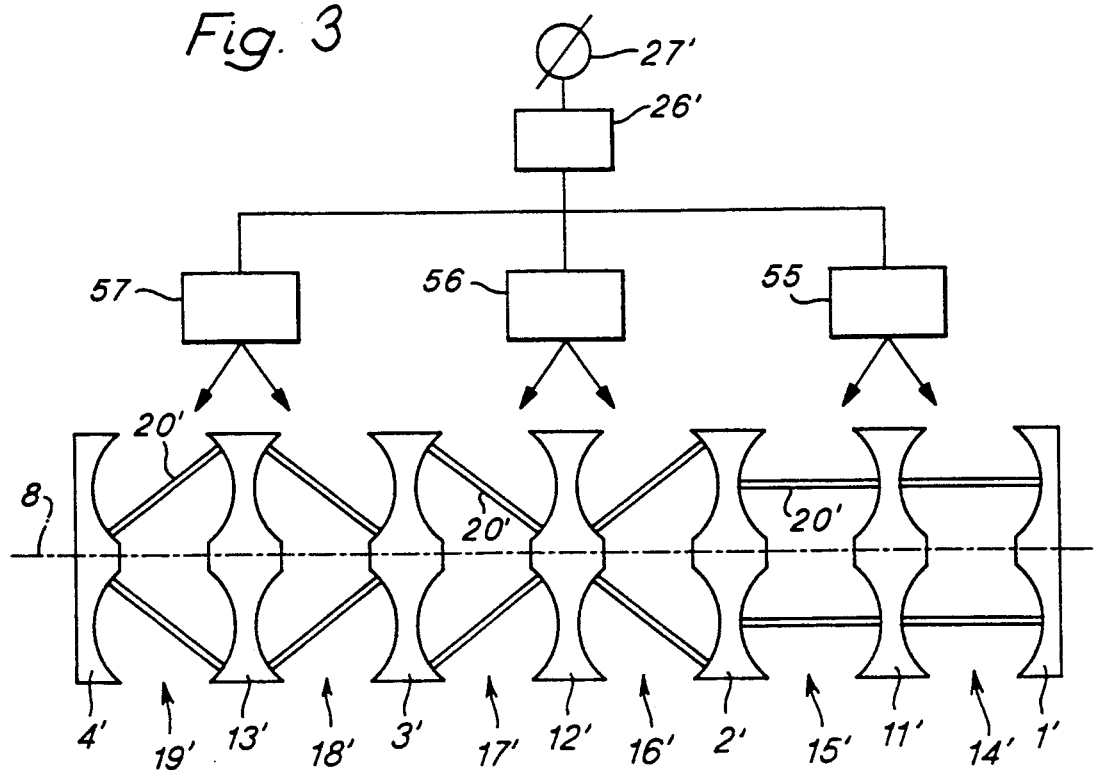
FIG. 3 shows a further alternative schematically.

The rollers 20 in all six of sets 14 to 19 shown in FIG. 1 lie at the same angle relative to axis 8, and must necessarily do so because three equal-sized output discs 11–13 drive equal-sized output shaft sprockets 38, and must therefore rotate at the same speed. However, as has already been noted, this restriction is not necessary to the invention. In the alternative embodiment shown in FIG. 2 three output shafts 45, 46 and 47, carrying chain sprockets 48, 49 and 50 respectively, are distributed at substantially equal angular intervals around input shaft 5. Sprocket 48 is driven from output disc 11 by way of a chain 51, sprocket 49 is driven by way of a chain 52 from disc 12, and sprocket 50 is driven by way of a chain 53 from disc 13, discs 11–13 being arranged as in FIG. 1 but not themselves shown in FIG. 2. Sprocket 50 is of larger diameter than sprocket 49, which is in turn larger than 48, so that if discs 11–13 are of equal size, and all the rollers 20 are at the same angular setting, as in FIG. 1, the single input shaft 5 is now driving three output shafts at unequal speeds, 47 slowest and 45 fastest with 46 in between. Further flexibility can be achieved if, as shown in FIG. 3, the valve system 26' and associated hydraulics and controls 55–57 are used to cause the rollers 20' in the three group pairings 14', 15'; 16'; 17'; and 18', 19' to take up different angular settings so as to establish different speed ratios between their respective input and output discs. It should be noted particularly that in a multiple-output variant of the invention, as shown in FIG. 2, the pressure of the fluid supplied to cylinder cavity 41 by valve system 26 must of course be sufficient to create an end-load that generates enough roller/race reaction at whichever of the output discs 11–13 is under the greatest load.

Although the invention has been described with reference to examples in which the input and output discs are all coaxial with the input shaft, and the output shaft or shafts are parallel to but displaced from it, the reverse arrangement in which the discs are all coaxial with an output shaft, and at least one input shaft is displaced from them, is also within the scope of the invention. In particular a reversal of the arrangement of FIG. 2 is foreseen, in which there is a single output shaft (5) driven by a plurality of input shafts (45–47) rotating at different speeds. If the rollers in the different group pairings have the facility to take up different angular settings, then within limits fluctuation in the speeds of rotation of the input shafts 45–47 can be accommodated.

In another foreseen embodiment of the invention, if the design shown in FIG. 1 were modified by connecting the rims of the output discs 11–13 to a bell-shaped member, as shown for example in GB-C-2023753, it would be possible to arrange the input and output axes 8, 36 so that they coincided.

We claim:

1. A variator transmission of the toroidal-race rolling traction type comprising at least two input discs (1–4) and at least two output discs (11–13) arranged alternately in coaxial sequence, wherein all discs except the first (1) and last (4) in the sequence are formed with part-toroidal races (9, 10) on both faces of the disc thereby defining a sequence of at least four clearances where an input and output race confront each other across an imaginary torus, and a separate set of rollers (14–19) of adjustable orientation arranged to transmit traction across each successive clearance between the respective input and output races;

means to exert a control force on each said roller;

each said roller being free to adjust its said orientation to a valve at which the said control force is balanced by the resultant reaction force exerted upon the roller at its interface with the said input and output forces;

and means (35–19) to transmit drive from the output discs to at least one rotatable output member.

2. A variator transmission according to claim 1 comprising an uneven number of discs, from relative rotation, and means is provided to subject the end discs to an axial force to urge them and all the other discs into traction-transmitting contact with the rollers.

3. A variator transmission according to claim 2 wherein the end discs are input discs, one of the end disc is fixed to an input shaft, and all the other discs are mounted on and have freedom to move axially relative to the input shaft, and the axial force is applied to the other end disc.

4. A variator transmission according to claim 1 comprising hydraulic means to determine the orientation of the rollers.

5. A variator transmission according to claim 1 comprising a single rotatable output member (35).

6. A variator transmission according to claim 5 wherein the output member is drivingly connected with more than one (11-13) output disc 7. A variator transmission according to claim 1 comprising a plurality of output members and means connecting each such member in driving connection with at least one of the output discs.

8. A variator transmission according to claim 5 wherein the single rotatable output member includes a shaft (35) parallel to but displaced from the common axis (8) of the discs, and means are provided to transmit drive from each output disc to this shaft.

9. A variator transmission according to claim 7 wherein the output members comprise shafts spaced from, parallel to and disposed at angular intervals around the common axis of the discs.

10. A variator transmission according to claim 1 comprising at least one rotatable input member, arranged parallel to but displaced from the common axis of the discs and in driving connection with a least one of the input discs.

* * * * *